(No Model.) 3 Sheets—Sheet 1.

W. D. WATKINS.
HAY RAKE AND STACKER.

No. 417,300. Patented Dec. 17, 1889.

Witnesses
M. Fowler
Wm. Bagger

Inventor
William D. Watkins
By his Attorneys,
C. A. Snow & Co.

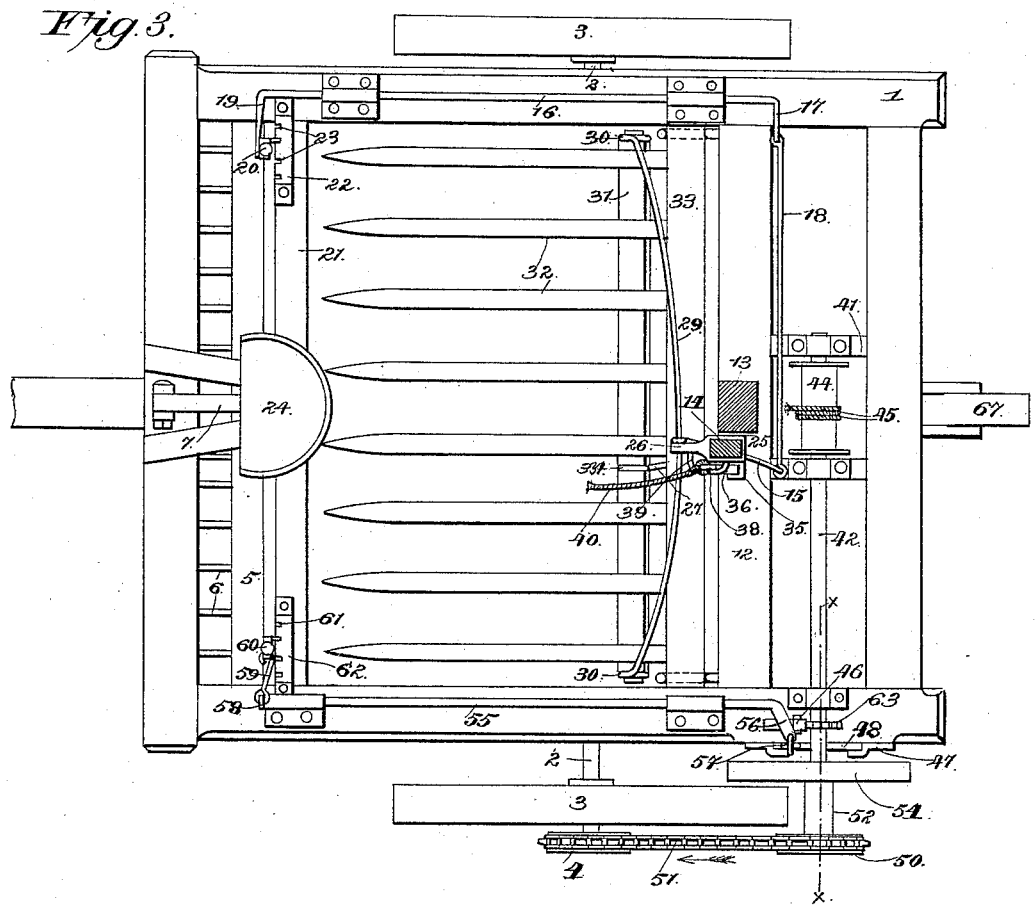

(No Model.) 3 Sheets—Sheet 3.

W. D. WATKINS.
HAY RAKE AND STACKER.

No. 417,300. Patented Dec. 17, 1889.

Witnesses
M. E. Fowler
Wm. Bagger

By his Attorneys,
C. A. Snow & Co.

Inventor
William D. Watkins

United States Patent Office.

WILLIAM D. WATKINS, OF OSCEOLA, MISSOURI, ASSIGNOR OF ONE-HALF TO JOHN H. LUCAS, OF SAME PLACE.

HAY RAKE AND STACKER.

SPECIFICATION forming part of Letters Patent No. 417,300, dated December 17, 1889.

Application filed September 6, 1889. Serial No. 323,187. (No model.)

*To all whom it may concern:*

Be it known that I, WILLIAM D. WATKINS, a citizen of the United States, residing at Osceola, in the county of St. Clair and State of Missouri, have invented a new and useful Hay Rake and Stacker, of which the following is a specification.

This invention relates to hay rakes and stackers; and it has for its object to construct a machine of this class which shall possess superior advantages in point of simplicity, durability, and general efficiency.

With these ends in view the invention consists in the improved construction, arrangement, and combination of parts which will be hereinafter fully described, and particularly pointed out in the claims.

Figure 1:
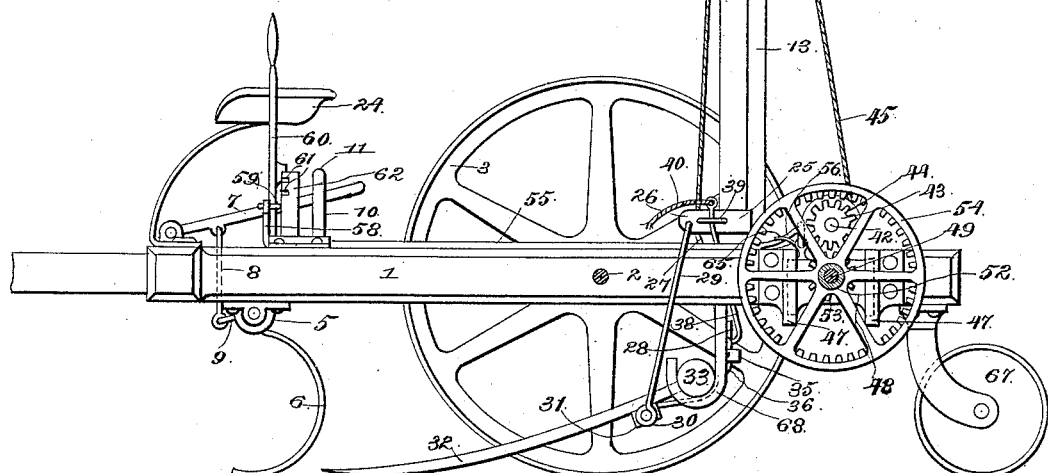
Figure 2:
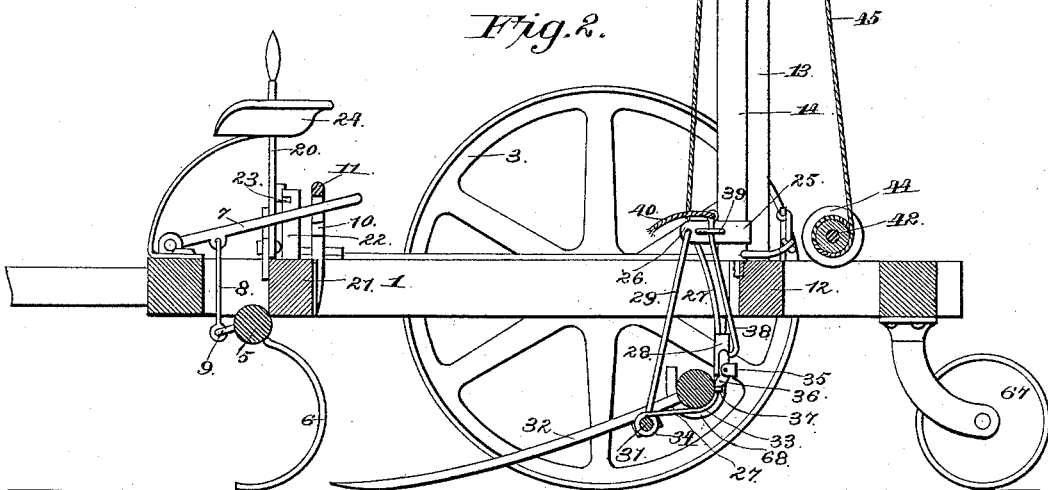
Figure 7:
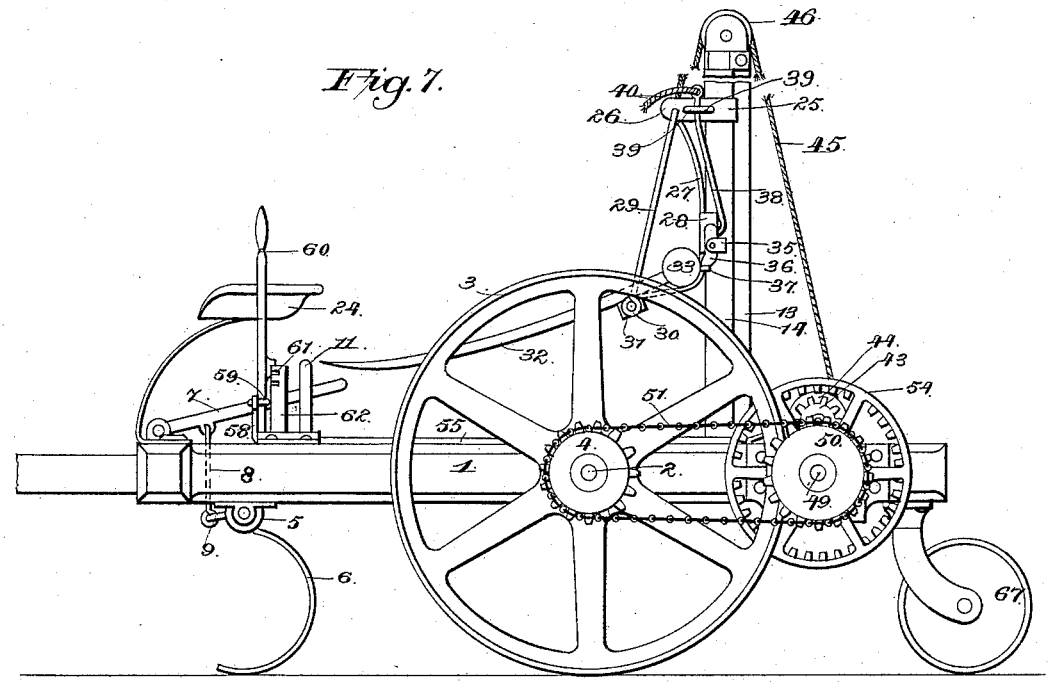
Figure 8:
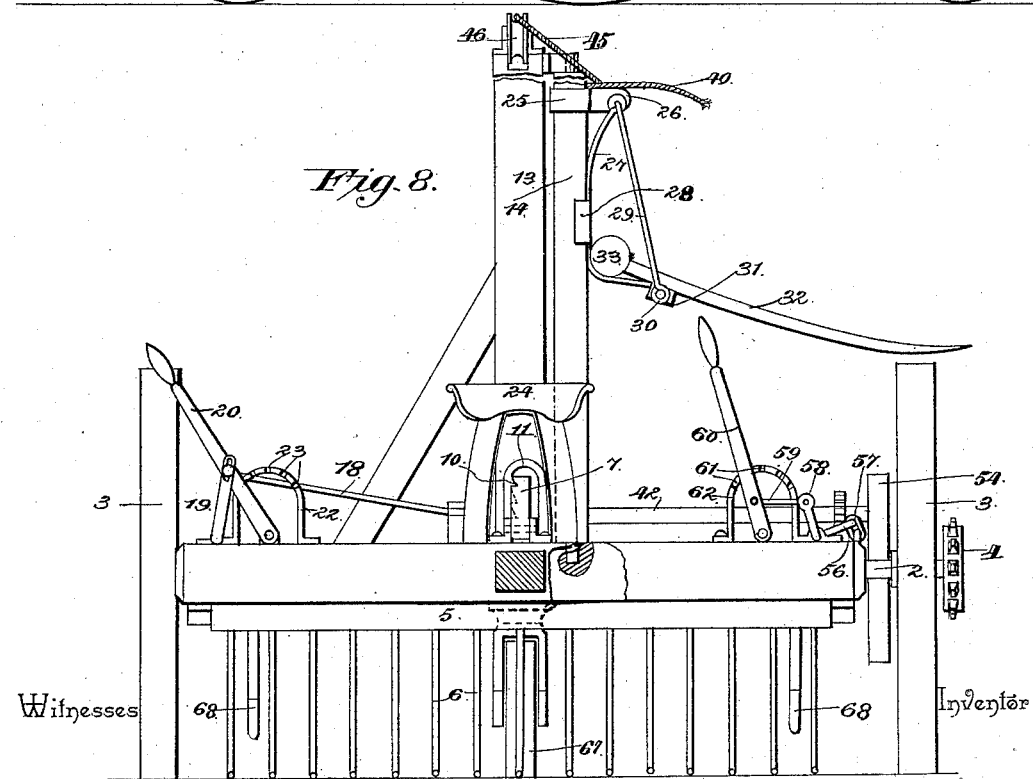

In the drawings hereto annexed, Figure 1 is a side elevation of my improved hay rake and stacker, showing the rake in position for operation and the fork lowered to receive the load. Fig. 2 is a longitudinal view of the same. Fig. 3 is a top view. Fig. 4 is a perspective detailed view of the trip mechanism for operating the fork. Fig. 5 is a detailed view of the pawl-and-ratchet mechanism for holding and releasing the windlass-shaft. Fig. 6 is a sectional view taken on the line $x\,x$ in Fig. 3. Fig. 7 is a side view of the machine, showing the fork in a raised position. Fig. 8 is a front elevation showing the fork in position for dumping the load.

Like numerals of reference indicate like parts in all the figures.

1 designates a rectangular frame, the sides of which are provided with stub-axles 2 2, upon which the transporting-wheels 3 3 are loosely journaled. Suitably attached to the hub of one of the transporting-wheels is a sprocket-wheel 4. Journaled in suitable bearings under the front end of the frame is a rake-head 5, having the usual curved rake-teeth 6. A lever 7, which is pivoted to the front end of the frame, is connected by a link 8 with the front side of the rake-head 5, which is provided with a forwardly-extending arm 9, to which the said link is connected. The lever 7 is adapted to engage notches 10 in an upright 11, rising from the frame 1, and serving to retain the said lever and the rake-head in any position to which they may be adjusted. During operation the rake-head and teeth assume the position shown in Figs. 1 and 2 of the drawings. When the load is to be discharged from the rake, the lever 7 is released from the notch which it was engaging, thus enabling the rake-head to tilt in its bearings and the load to be discharged from the teeth.

The frame 1 is provided near its rear end with a cross-bar 12, upon which is mounted an upright 13, which is suitably braced to maintain it in a vertical position. Journaled in suitable bearings—such as brackets extending from the upper and lower ends of the upright 13—is a rock-bar 14, the lower end of which has a rearward-extending arm 15. Journaled in suitable bearings on the upper side of one of the side pieces of the frame 1 is a rock-shaft 16, the rear end of which has an arm or crank 17, which is connected by a link 18 with the arm 15, extending from the lower end of the rock-bar 14. The front end of the rock-shaft 16 has a crank 19, which is pivotally connected with a lever 20, pivoted upon a cross-bar 21 near the front end of the frame 1. The lever 20 is adapted to engage any one of a series of notches 23 in a segmental bracket 22, mounted upon the cross-bar 21 of the frame. The driver's seat 24 is suitably mounted centrally upon the front end of the frame. It will be seen that by operating the lever 20, which is conveniently accessible to the driver, the rock-bar 14 may be turned or swung in its bearings, the purpose of which will be presently described.

25 designates a sleeve arranged to slide vertically upon the rock-bar 14, and having a forwardly-extending bracket 26, which is connected by a rod 27 with a guide-plate 28, adapted to bear against the front side of the rock-bar. The bracket 26 has a transverse perforation, through which extends a yoke 29, the ends of which are provided with eyes 30, forming bearings for a transverse bar or rock-shaft 31, which is secured under the tines 32 of the fork, the head of which is designated by 33. The connecting-bar 27 is extended from the guide-plate 28 in a forward direction under the head of the fork, and is provided with an eye 34, which is journaled upon the cross-bar or rock-shaft 31.

The guide-plate 28 is provided with a laterally-extending bracket 35, in which is pivotally mounted a pawl or trip 36, adapted to bear against a lug 37, extending rearwardly from the head of the fork, which is thereby held in position to elevate the load, with the tines extending forwardly in an approximately-level position. To the pawl 36 is attached an upwardly-extending trip-lever 38, working in a staple or keeper 39, secured on one side of the sleeve 25, and having a trip-rope 40 attached to its upper end. It will be seen that when the trip-rope is pulled, so as to disengage the pawl 36 from the lug 37, the fork will turn upon the pivots formed by the rock-shaft 31, and thus dump or discharge the load.

In suitable bearings upon one of the side pieces of the frame and upon braces 41, connecting the cross-bar 12 with the rear frame-piece, is journaled a shaft 42, the outer end of which has a pinion 43. At its inner end the shaft 42 is provided with a drum or windlass 44, upon which is wound a rope 45, passing over a pulley 46 at the upper end of the upright 13, and attached to the sleeve 25, sliding upon the rock-bar 14. The side of the frame is provided with vertical cleats 47, between which slides a plate 48, having an outwardly-extending spindle 49, upon which is journaled a sprocket-wheel 50, which is connected by a chain 51 with the sprocket-wheel 4 upon the transporting-wheel 3 of the machine.

The inner end of the hub 52 of the sprocket-wheel 50 carries a pinion 53 and an internally-toothed spur-wheel 54, either of which may be made to mesh with the pinion 43 at the outer end of the windlass-shaft 42. The relative sizes of the pinions 43 and 53 and the internally-toothed wheel 54 are such, however, that by properly adjusting the plate 48, carrying the spindle upon which the pinion 53 and the gear-wheel 54 are mounted, the latter may be so adjusted that neither of them shall engage the pinion 43. This position has been illustrated in Fig. 6 of the drawings.

To adjust the vertically-sliding plate 48 with its attachments, I avail myself of a rock-shaft 55, mounted in suitable bearings upon the adjacent side of the frame, and having at its rear end a crank 56, which is connected with the vertically-sliding plate 48 by means of a link 57. The front end of the rock-shaft 55 is provided with a crank 58, connected by a link 59 with a lever 60, which is mounted pivotally upon the front cross-bar of the frame and adapted to engage any one of a series of notches 61 in a segmental bracket 62, secured to the said frame-bar. By this mechanism, the operating-lever of which may be conveniently reached by the driver, the vertically-sliding plate 48, with its attachments, may be readily adjusted so as to effect the desired adjustment of the gear-wheels 53 and 54, adapted to engage the pinion 43 upon the outer end of the windlass-shaft.

The windlass-shaft 42 is provided near its outer end with a ratchet-wheel 63, adapted to be engaged by a pawl 64, which is pivoted upon the side bar of the frame. The pawl 64 is provided at its lower end with a rearwardly-extending arm 65, which extends under the crank 56 at the rear end of the rock-shaft 55. The relative arrangement of these parts is such that when the rock-shaft is turned to such a position as to lower the plate 48, so as to throw the internally-toothed wheel 54 into engagement with the pinion 43, the crank 56 will strike the arm 65 of the pawl 64, and thereby throw the latter out of engagement with the ratchet-wheel 63, and thus permit the windlass-shaft to be freely rotated by the pinion 43 engaging the gear-wheel 64. When, however, the rock-shaft 65 is turned so as to raise the plate 48 and throw the gear-wheels 53 and 54 out of engagement with the pinion 43 or to cause the latter to be engaged by the pinion 53, the crank 56 is released from contact with the arm 65 of the pawl, and the latter will then be restored to engagement with the ratchet-wheel 63 by the action of a suitably-arranged spring 66.

Under the rear ends of the frame are arranged the swiveled caster-wheels 67, which serve to assist in guiding the machine and to retain it in a level position for operation.

From the foregoing description, taken in connection with the drawings hereto annexed, the operation and advantages of my invention will be readily perceived. Normally, when the machine progresses over the field, the fork is lowered to the position shown in Figs. 1 and 2, when the head of the fork will rest and be supported in hooks or brackets 68, suitably attached to the frame of the machine. When the fork is in this position, the plate 48 will be so adjusted as to hold the pinion 53 and gear-wheel 54 out of engagement with the pinion 43 upon the windlass-shaft. When a load has been accumulated by the rake in front of the fork, the rake is tilted, thus discharging its load upon the fork, and this may be repeated until a sufficient load has been accumulated upon the fork. The rock-shaft 55 is now manipulated by the operating-lever, so as to raise the plate 48 and throw the pinion 53 into engagement with the pinion 43, thus rotating the windlass-shaft 42, winding the rope 45 upon the drum 44, and elevating the load carried upon the fork to the desired height. When this has been attained, the plate 48 is again lowered, throwing the pinions 53 and 43 out of mesh. The windlass-shaft will now be prevented from rotating by the pawl 64 engaging the ratchet-wheel 63, and the load may thus be transported by the machine to any place where it shall be desired to dump it for the purpose of building a stack. When this place has been reached, the rock-shaft 16 is operated by the lever 20, so as to turn the rock-bar 14 and swing the fork, carrying the load to the position shown in Fig. 8, extending somewhat over the side of the frame. By pulling the trip-rope the pawl 36 may then be disengaged from the lug 37 upon the fork-head, thereby causing the weight of the load to tilt the fork and to be discharged. The weight of the fork-head is sufficient to overbalance that of the tines; hence as soon as the load has been discharged the fork will again assume its normal position. For the purpose of lowering the fork the rock-shaft 55 is operated so as to lower the plate 48 and bring the internally-toothed wheel 54 into engagement with the pinion 43. At the same time the arm or crank 56 of the rock-shaft 55 will strike the arm 65 of the pawl 64, thereby releasing the latter from engagement with the ratchet-wheel 63, and thus enabling the windlass-shaft to be rotated in a reversed direction to unwind the rope 45. When the fork has been lowered to the desired point, the plate 48 is again raised to its central position, in which the pinion 53 and gear-wheel 54 are out of mesh with the pinion 43, and the machine is then in position for a repetition of the operation.

A spring $68^a$ may be interposed between the trip-lever 38 and the staple in which it works, to assist in restoring the pawl 36 to engagement with the lug 37.

Having thus described my invention, I claim and desire to secure by Letters Patent—

1. In a hay rake and stacker, the combination of a wheeled frame having an upright provided with a pulley at its upper end, a rock-bar journaled vertically to the said upright, a sleeve sliding vertically upon the said rock-bar and having a forwardly-extending bracket, a yoke extending through the said bracket, the fork having a rock-shaft secured transversely under its tines and journaled in the said yoke, a rod extending downwardly from the bracket of the sleeve, having a guide-plate bearing against the rock-bar, extending under and supporting the fork-head, and having an eye journaled upon the rock-shaft, a pawl pivoted to a bracket upon the guide-plate and engaging a lug upon the rear side of the fork-head, a trip-lever attached to said pawl and having a trip-rope attached to its upper end, a hoisting-rope attached to the vertically-sliding sleeve, passing over the pulley at the top of the upright, and connected to a drum or windlass, and mechanism for operating the latter, substantially as and for the purpose set forth.

2. In a hay rake and stacker, the combination of the frame having an upright, a rock-bar journaled to the latter, a vertically-sliding sleeve mounted upon said rock-bar and carrying the fork and trip mechanism for the latter, a shaft journaled transversely in rear of the upright and having a drum or windlass, a hoisting-rope wound upon the latter, passing over a pulley at the top of the upright and connected with the vertically-sliding sleeve, mechanism for rotating the windlass-shaft in either direction, and a pawl and ratchet to prevent said windlass-shaft from rotating to unwind the hoisting-rope, substantially as and for the purpose set forth.

3. In a hay rake and stacker, the combination of the frame having an upright, a rock-bar journaled vertically to the latter, a sleeve sliding upon said rock-bar and carrying the fork and trip mechanism, a rock-shaft journaled longitudinally upon the frame and having its front end connected with an operating-lever, a crank at the rear end of said rock-shaft, and a link connecting said crank with an arm extending rearwardly from the rock-bar, substantially as and for the purpose set forth.

4. In a hay rake and stacker, the combination of the frame having an upright, a rock-bar journaled vertically to the latter, the sleeve sliding vertically upon said rock-bar and carrying the fork, mechanism for raising and lowering the said sleeve and for retaining it in any position to which it may be adjusted, and mechanism for swinging the rock-bar in its bearings, substantially as and for the purpose set forth.

5. The combination of the windlass-shaft having a ratchet-wheel and provided with a pinion at its outer end, a pawl engaging said ratchet-wheel and having a spring-pressed arm, a vertically-sliding plate having a spindle carrying a pinion and an internally-toothed wheel, both adapted to engage the pinion upon the windlass-shaft, a rock-shaft journaled upon the frame and connected at its front end with an operating-lever, a crank at the rear end of said rock-shaft extending over the arm of the pawl and connected with the vertically-sliding plate, and mechanism for transmitting rotary motion to the pinion and the internally-toothed wheel from one of the transporting-wheels of the machine, substantially as set forth.

6. In a hay rake and stacker, the combination of the frame, the tilting rake at the front end of said frame, the upright, the rock-bar journaled to the latter, the sleeve sliding upon said rock-bar and carrying the fork and trip mechanism, the windlass-shaft having the drum, the hoisting-rope wound upon the latter, passing over a pulley at the top of the upright and connected with the vertically-sliding sleeve upon the rock-bar, mechanism for swinging the latter in its bearings, a vertically-sliding plate having a spindle, a pinion, and an internally-toothed wheel mounted upon said spindle and adapted to engage a pinion upon the outer end of the windlass-shaft, a ratchet-wheel secured upon the latter, a pawl engaging the said ratchet-wheel and having a spring-pressed arm, a rock-shaft journaled longitudinally upon the frame and connected at its front end with an operating-lever, a crank at the rear end of said rock-shaft, extending over and adapted to engage the spring-pressed arm of the pawl and connected with the vertically-sliding plate carrying the pinion and the internally-toothed wheel, and mechanism for transmitting motion to said wheel and pinion from one of the transporting-wheels of the machine, substantially as and for the purpose set forth.

In testimony that I claim the foregoing as my own I have hereto affixed my signature in presence of two witnesses.

WILLIAM D. WATKINS.

Witnesses:
    G. H. DANIEL,
    LESLIE RODGERS.